(12) United States Patent
Kanamori

(10) Patent No.: US 12,131,467 B2
(45) Date of Patent: *Oct. 29, 2024

(54) IMAGE PROCESSING APPARATUS, RADIOGRAPHIC IMAGING SYSTEM, RECORDING MEDIUM, AND EXPOSURE INDEX CALCULATION METHOD

(71) Applicant: KONICA MINOLTA, INC., Tokyo (JP)

(72) Inventor: Koutarou Kanamori, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 17/846,921

(22) Filed: Jun. 22, 2022

(65) Prior Publication Data

US 2022/0335608 A1   Oct. 20, 2022

Related U.S. Application Data

(63) Continuation of application No. 16/782,431, filed on Feb. 5, 2020, now Pat. No. 11,398,025.

(30) Foreign Application Priority Data

Feb. 22, 2019   (JP) .................................. 2019-030696

(51) Int. Cl.
   *G06T 7/00*   (2017.01)
(52) U.S. Cl.
   CPC .. *G06T 7/0012* (2013.01); *G06T 2207/10116* (2013.01); *G06T 2207/20072* (2013.01)

(58) Field of Classification Search
   CPC ......... G06T 7/0012; G06T 2207/20072; G06T 2207/10116; G06T 2207/30168
   See application file for complete search history.

(56) References Cited

U.S. PATENT DOCUMENTS

| | | | |
|---|---|---|---|
| 8,845,190 | B2 | 9/2014 | Foos et al. |
| 9,978,163 | B2 | 5/2018 | Nagai et al. |
| 10,762,384 | B2 | 9/2020 | Ito et al. |
| 11,426,138 | B2 * | 8/2022 | Obara ................. A61B 6/545 |
| 2006/0147101 | A1 | 7/2006 | Zhang et al. |
| 2015/0359498 | A1 | 12/2015 | Zou et al. |

(Continued)

FOREIGN PATENT DOCUMENTS

| | | | |
|---|---|---|---|
| EP | 1444952 | A1 | 8/2004 |
| JP | 2012245229 | A * | 12/2012 |

(Continued)

OTHER PUBLICATIONS

Japanese Office Action (and English language translation thereof) dated Jan. 4, 2023, issued in Japanese Application No. 2019-030696 (which is a counterpart of parent U.S. Appl. No. 16/782,431).

(Continued)

*Primary Examiner* — Siamak Harandi
(74) *Attorney, Agent, or Firm* — Holtz, Holtz & Volek PC

(57) ABSTRACT

An image processing apparatus includes a hardware processor that acquires image data of a radiograph, calculates an exposure index related to noise in the radiograph on the basis of the image data that is acquired, and causes a notifier to notify of a matter based on the exposure index that is calculated.

16 Claims, 7 Drawing Sheets

(56) References Cited

U.S. PATENT DOCUMENTS

| | | | |
|---|---|---|---|
| 2016/0095567 A1 | 4/2016 | Tachikawa | |
| 2018/0368800 A1 | 12/2018 | Ishii et al. | |

FOREIGN PATENT DOCUMENTS

| | | | |
|---|---|---|---|
| JP | 2014158580 A | 9/2014 | |
| JP | 2016022007 A | 2/2016 | |
| JP | 2016022070 A | 2/2016 | |
| JP | 2016202219 A | 12/2016 | |
| JP | 2018192129 A | 12/2018 | |

OTHER PUBLICATIONS

Japanese Office Action (and an English language translation thereof) dated Nov. 14, 2023, issued in counterpart Japanese Application No. 2023-070900.

* cited by examiner

IMAGE PROCESSING APPARATUS, RADIOGRAPHIC IMAGING SYSTEM, RECORDING MEDIUM, AND EXPOSURE INDEX CALCULATION METHOD

CROSS-REFERENCE TO RELATED APPLICATIONS

This application is a Continuation Application of U.S. application Ser. No. 16/782,431, filed Feb. 5, 2020, which is based upon and claims the benefit of priority from Japanese Patent Application No. 2019-030696 filed on Feb. 22, 2019, the entire contents of all of which are incorporated by reference herein.

BACKGROUND

Technological Field

The present invention relates to an image processing apparatus, a radiographic imaging system, a recording medium, and an exposure index calculation method.

Description of the Related Art

A digital radiation detector automatically performs image processing (such as gradation processing) on a created radiograph, instead of conventional films, to maintain specific luminance and contrast. Accordingly, it is difficult for a user to determine from the obtained radiograph whether radiation of a dose intended by the user reached the radiation detector or not.

Conventionally, manufacturers of radiation detectors and the like independently provided indices for evaluating a dose reaching the radiation detector; however, in recent years, a unified index called an exposure index (hereinafter "EI") has come to be used as a determination criterion.

Whether radiation of a dose intended by a user reached a radiation detector or not is determined on the basis of how much a calculated EI is deviated (deviation; deviation index, hereinafter "DI") from a target value of the EI (target exposure index; hereinafter "EIT") determined for each radiographing condition. Accordingly, a technique is conventionally proposed of appropriately setting the EIT or revising the EIT as necessary.

For example, JP 2018-192129 A focuses on the fact that a reaching dose (EI) changes depending on whether a grid is present or not, and describes a radiographic imaging apparatus that selects a different EIT depending on whether a grid is present or not.

Furthermore, J P 2016-022007 A describes a radiation dose management apparatus that, to facilitate revision of EIT, acquires a plurality of EIs and a plurality of DIs belonging to a target group from a database DB, and that creates and displays an EI distribution graph and an EI/DI graph on the basis of the plurality of EIs and the plurality of DIs.

SUMMARY

When radiation hits a subject, a part of the radiation is diffusely reflected as scattered radiation. Scattered radiation is a cause of noise that reduces an image quality (such as S/N) of a radiograph, and it is known that a subject having a great body thickness (that is, an obese subject) generates a greater amount of scattered radiation.

On the other hand, the EI is a value that is obtained simply by converting the dose of radiation that reached a radiation detector into a numerical value, and the numerical value is inclusive of scattered radiation. However, how much of the radiation that reached the radiation detector is scattered radiation cannot be determined from the EI.

Accordingly, radiographic imaging that uses conventional apparatuses, as described in JP 2018-192129 A and JP 2016-022007 A, that notify of the EI and an index derived from the EI sometimes fails to achieve a radiograph of an intended image quality even if the EI that is notified takes an appropriate value that is close to the EIT.

An object of the present invention is to enable a user to accurately determine, when a radiograph is captured, not only whether or not radiation of an intended dose reached a radiation detector, but also whether or not an intended image quality is achieved for the obtained radiograph.

To achieve at least one of the abovementioned objects, according to an aspect of the present invention, an image processing apparatus reflecting one aspect of the present invention comprises a hardware processor that:
  acquires image data of a radiograph,
  calculates an exposure index related to noise in the radiograph on a basis of the image data that is acquired, and
  causes a notifier to notify of a matter based on the exposure index that is calculated.

To achieve at least one of the abovementioned objects, according to another aspect of the present invention, a radiographic imaging system reflecting one aspect of the present invention comprises:
  a radiation detector that creates a radiograph, and
  an image processing apparatus including a hardware processor that acquires image data of the radiograph, calculates an exposure index related to noise in the radiograph on a basis of the image data that is acquired, and causes a notifier to notify of a matter based on the exposure index that is calculated.

To achieve at least one of the abovementioned objects, according to another aspect of the present invention, a recording medium reflecting one aspect of the present invention is a non-transitory recording medium storing a computer-readable program causing a hardware processor of an electronic appliance including a controller to perform:
  acquiring image data of a radiograph, and
  calculating an exposure index related to noise in the radiograph on a basis of the image data that is acquired.

To achieve at least one of the abovementioned objects, according to another aspect of the present invention, an exposure index calculation method reflecting one aspect of the present invention comprises:
  creating a density histogram of a region of interest that is set in a whole or a part of a radiograph;
  extracting a plurality of pixels with signal values within a specific range from the density histogram that is created;
  creating an extracted image using the plurality of pixels that are extracted;
  performing frequency analysis on the extracted image that is created; and
  calculating an exposure index related to noise in the radiograph on a basis of a frequency analysis result that is obtained.

To achieve at least one of the abovementioned objects, according to another aspect of the present invention, an image processing apparatus reflecting one aspect of the present invention comprises a hardware processor that:
  acquires image data, creates a density histogram of a region of interest that is set in a whole or a part of an image based on the image data that is acquired, extracts a plurality of pixels with signal values within a specific range from the density histogram that is created, creates an extracted image using the plurality of pixels that are extracted, performs frequency analysis on the extracted image that is created, calculates an image quality index related to noise in the image on a basis of a frequency analysis result that is obtained, and causes a notifier to notify of a matter based on the image quality index that is calculated.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION OF THE EMBODIMENTS

Hereinafter, embodiments of the present invention will be described with reference to the drawings. However, the scope of the invention is not limited to the disclosed embodiments.

First Embodiment

First, a first embodiment of the present invention will be described.
(Radiographic Imaging System)

Figure 1:
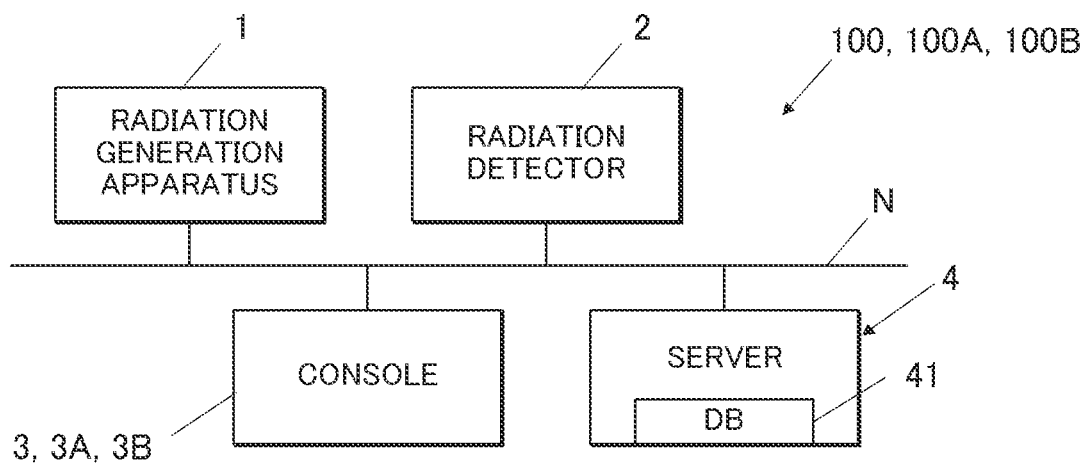
FIG. 1 is a block diagram showing a radiographic imaging system according to a first (second, third) embodiment of the present invention.

First, a schematic configuration of a radiographic imaging system 100 according to the present embodiment will be described. FIG. 1 is a block diagram showing the radiographic imaging system 100.

Additionally, reference signs in brackets in FIG. 1 are related to second and third embodiments described later.

As shown in FIG. 1, the radiographic imaging system 100 of the present embodiment includes a radiation generation apparatus 1, a radiation detector 2, a console 3, and a server 4.

These are capable of communicating with one another over a network N.

Additionally, the radiographic imaging system 100 may also be connectable to a hospital information system (HIS), a radiology information system (RIS), a picture archiving and communication system (PACS), an image analysis apparatus and the like, which are not shown.

Although not shown, the radiation generation apparatus 1 includes a generator that applies a voltage according to radiation emission conditions (tube voltage, tube current, emission time (mAs value), and the like) set in advance, when an emission instruction switch is operated, a radiation source that generates radiation (such as X-rays) of a dose according to an applied voltage, when a voltage is applied by the generator, and the like.

Furthermore, the radiation generation apparatus 1 generates radiation (such as X-rays) in a mode according to a radiograph (still image/moving image) to be captured.

Additionally, the radiation generation apparatus 1 may be installed inside a radiography room, or may be combined with the console 3 and the like in the form of a so-called mobile nursing cart.

Although not shown, the radiation detector 2 includes a substrate where radiation detection elements that generate charges according to a dose when radiation is received and pixels including switch elements that accumulate or discharge charges are arranged two-dimensionally (in a matrix), a scanning circuit that switches each switch element between on and off, a reading circuit that reads out the amount of charges discharged from each pixel in the form of a signal value, a controller that creates a radiograph from a plurality of signal values read out by the reading circuit, an outputter that outputs data such as the created radiograph to outside, and the like.

The radiation detector 2 creates, in synchronization with a timing of emission of radiation by the radiation generation apparatus 1, a radiograph that is according to the emitted radiation.

Additionally, the radiation detector 2 may include a built-in scintillator, and may convert emitted radiation into light of another wavelength, such as visible light, by the scintillator and generate charges according to the converted light (a so-called indirect type), or may directly generate charges from radiation without using the scintillator or the like (a so-called direct type).

Moreover, the radiation detector 2 may be a dedicated type that is integrated with a radiography table, or may be a mobile type (a cassette type).

The console 3 is an image processing apparatus or an electronic appliance, and is a PC, a dedicated apparatus or the like.

The console 3 enables setting of various radiographing conditions (tube voltage, tube current, emission time (mAs value), frame rate, physical frame of subject, presence/absence of grid, and the like) in a radiographing apparatus or the like, on the basis of radiographing order information acquired from another system (such as the HIS or the RIS) or an operation by a user.

Details of the console 3 will be given later.

The server 4 is a PC, a dedicated apparatus, a virtual server on a cloud, or the like.

Furthermore, the server 4 includes a database 41.

Additionally, in the present embodiment, the database 41 is provided in the server 4 that is separate from the console 3 and the like, but the database 41 may alternatively be provided in the console 3 or in another apparatus that is provided in the radiographic imaging system 100.

Furthermore, in the case where another system, such as the PACS, is connected to the radiographic imaging system 100, the database 41 may be provided in such other system.

With the radiographic imaging system 100 according to the present embodiment configured in the above manner, a radiograph of a subject may be captured by arranging the radiation source of the radiation generation apparatus 1 and the radiation detector 2 opposite each other with a gap therebetween and emitting radiation to the subject present between the radiation source and the radiation detector 2 from the radiation source.

In the case where the radiograph is a still image, emission of radiation and creation of the radiograph are performed just once by one radiographing operation (pressing of the emission instruction switch), and in the case where the radiograph is a moving image, emission of pulse radiation and creation of a frame image are repeated several times in a short time (for example, 15 times in one second) by one radiographing operation.

(Image Processing Apparatus)

Figure 2:
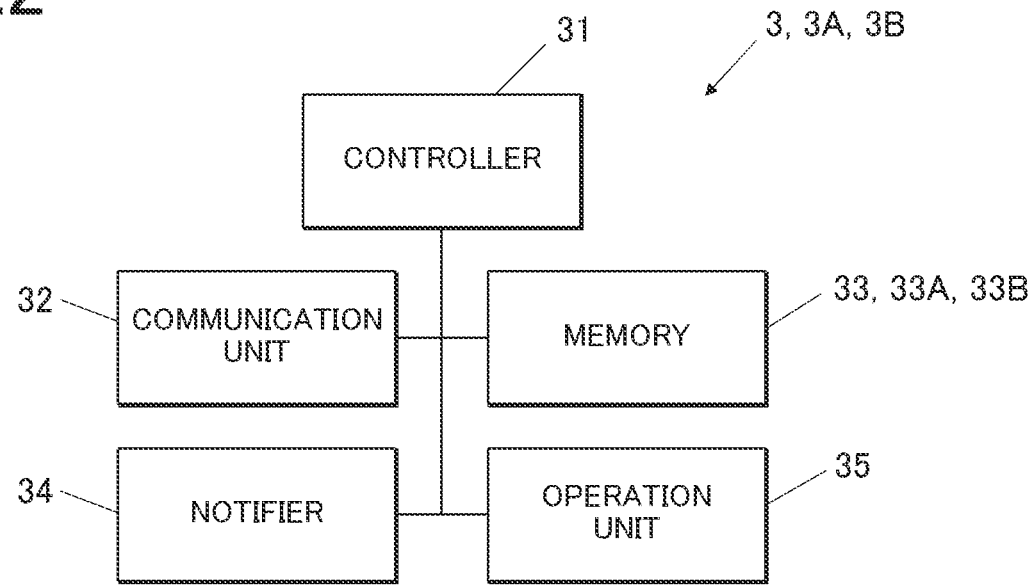
FIG. 2 is a block diagram showing a console (image processing apparatus) provided in the radiographic imaging system in FIG. 1.
Figure 3:
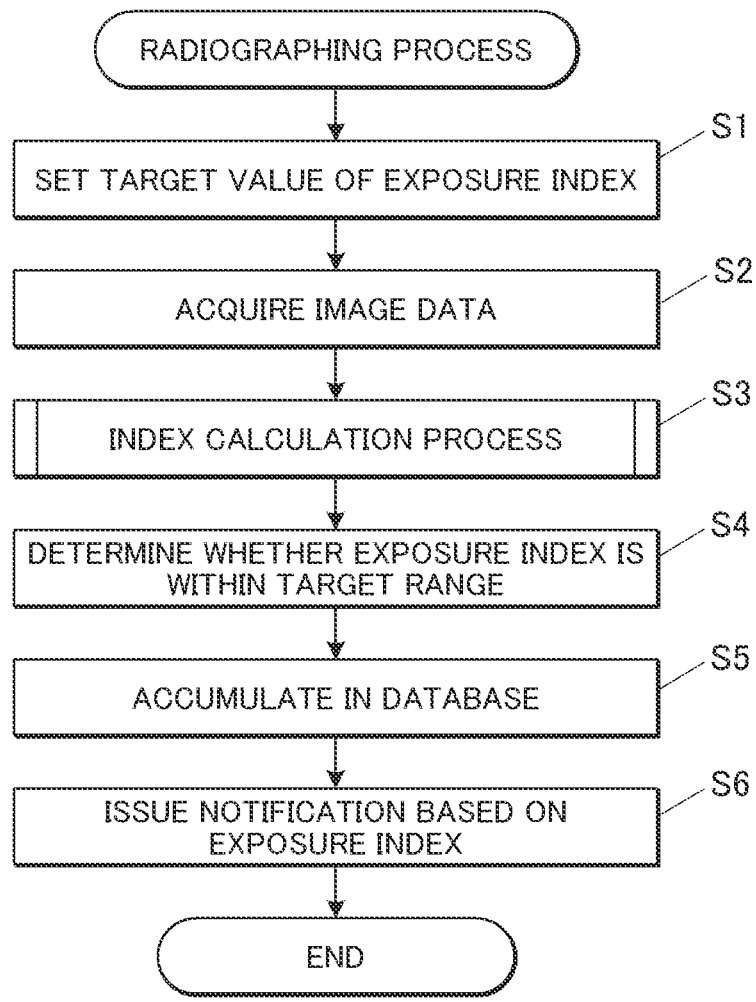
FIG. 3 is a flowchart showing a radiographing process performed by the console in FIG. 2.
Figure 4:
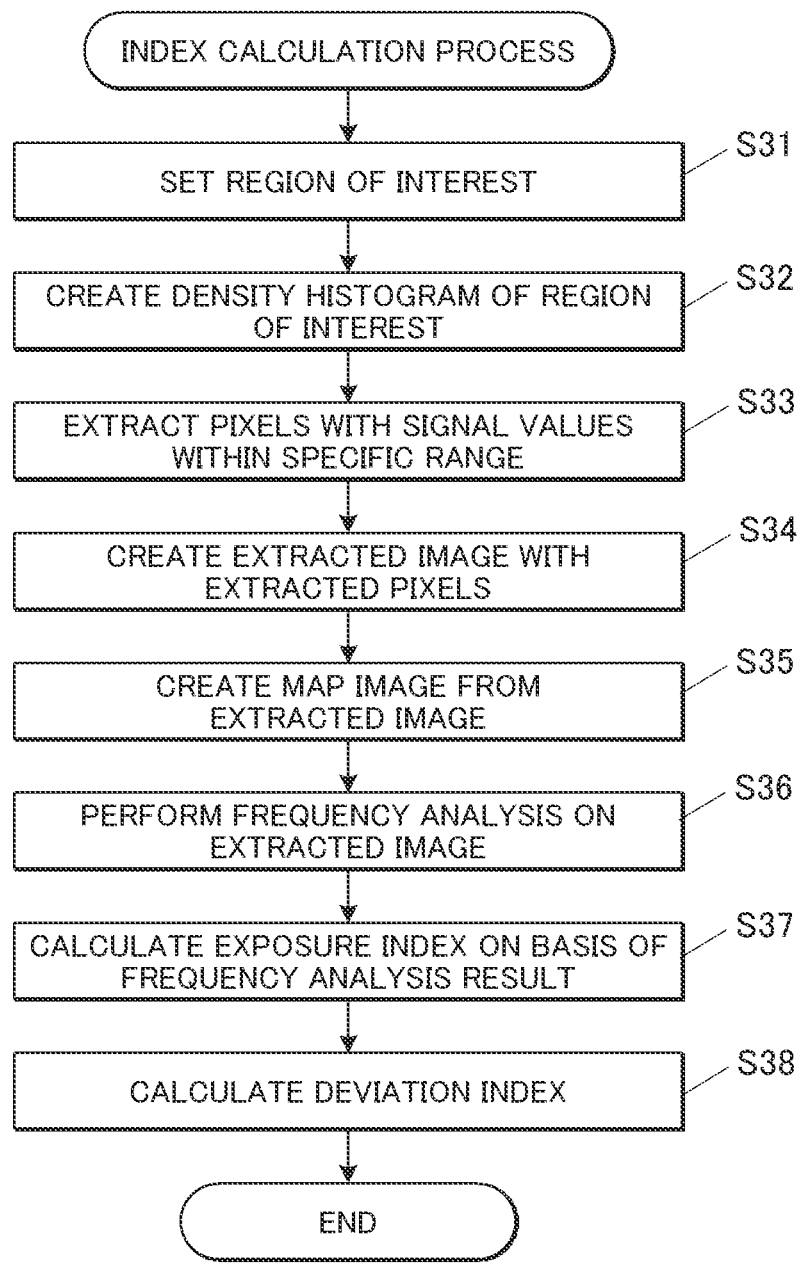
FIG. 4 is a flowchart showing an index calculation process in the radiographing process of the first embodiment.

Next, a specific configuration of the console 3 provided in the radiographic imaging system 100 described above will be described. FIG. 2 is a block diagram showing the console 3, FIG. 3 is a flowchart showing a radiographing process performed by the console 3, and FIG. 4 is a flowchart showing an index calculation process (step S3) in the radiographing process in FIG. 3.

Additionally, reference signs in brackets in FIG. 2 are related to second and third embodiments described later.

As shown in FIG. 2, the console 3 according to the present embodiment includes a controller 31 (hardware processor), a communication unit 32, a memory 33, a notifier 34, and an operation unit 35.

The units 31 to 35 are electrically connected with one another.

The controller 31 includes a central processing unit (CPU), a random access memory (RAM) and the like.

The CPU of the controller 31 reads and develops, in the RAM, various programs stored in the memory 33, executes various processes according to the developed programs, and controls operation of each unit of the console 3 in a centralized manner.

The communication unit 32 is a communication module or the like.

The communication unit 32 exchanges various signals and various pieces of data with other apparatuses and the like connected over a communication network N (a local area network (LAN), a wide area network (WAN), the Internet or the like).

The memory 33 is a non-volatile semiconductor memory, hard disk or the like.

The memory 33 stores various programs to be executed by the controller 31, parameters necessary to execute the programs, and the like.

Furthermore, the memory 33 according to the present embodiment stores a plurality of target values of the exposure index for respective radiographing parts and radiographing conditions (for example, at least one of a physical frame of a subject (normal, obese, slim or the like), presence/absence of a grid, or performance/non-performance of a scattered radiation correction process). The exposure index and the target value of the exposure index will be described later.

Additionally, the memory 33 may also be capable of storing radiographs.

The notifier 34 is a display apparatus that displays images, such as a liquid crystal display (LCD) or a cathode ray tube (CRT), a lamp that emits light (such as an LED), a speaker that outputs sound, a vibrator that vibrates, or the like.

The notifier 34 notifies of various indices described later, on the basis of control signals input from the controller 31 or power supplied from a power supply circuit, not shown, controlled by the controller 31.

The operation unit 35 is a keyboard including cursor keys, number keys, various function keys and the like, a pointing device such as a mouse, a touch panel stacked on the surface of a display apparatus, or the like.

The operation unit 35 outputs a control signal according to an operation by a user to the controller 31.

The controller 31 of the console 3 configured in the above manner includes a function of performing a radiographing process as shown in FIGS. 3 and 4, with turning on of power, a predetermined start operation or the like as a trigger, for example.

For example, as shown in FIG. 3, in the radiographing process according to the present embodiment, the controller 31 first sets a target value of the exposure index (step S1).

Unlike the conventionally used exposure index (EI; second exposure index), the "exposure index" here is related to noise (S/N (SN ratio) or a scattered radiation content). That is, the exposure index takes a numerical value that changes depending on not only the dose reaching the radiation detector 2, but also the scattered radiation content or S/N that affects the image quality.

Furthermore, the "target value of the exposure index" is a numerical value that is desirably reached by the exposure index calculated after radiographing, and in the present embodiment, a target value of the exposure index according to a combination of a set radiographing part and set radiographing conditions is selected from a plurality of target values of the exposure index according to combinations of radiographing parts and radiographing conditions stored in the memory 33.

After the target value is set, capturing of a radiograph is performed by the radiation generation apparatus 1 and the radiation detector 2. The console 3 is in standby during that time.

Additionally, the process in step S1 may be performed as a process that is separate from the radiographing process, and the process in step S2 or step S3 described later may be performed with a predetermined start operation or acquisition of image data of a radiograph as a trigger, for example.

After radiographing is performed, the controller 31 acquires image data of the radiograph (step S2).

"Acquisition" here includes reception from another apparatus (such as the radiation detector 2) or reading from a storage medium, for example. Furthermore, in the case where the memory 33 of the console 3 is capable of storing image data, the image data that is stored in the memory 33 after being received or acquired from another apparatus may also be read.

After the image data is acquired, the controller 31 performs the index calculation process of calculating an exposure index that is related to noise in the radiograph, on the basis of the acquired image data (step S3).

For example, as shown in FIG. 4, in the index calculation process, the controller 31 first sets a region of interest R (ROI) in a radiograph I (step S31).

Figure 5:
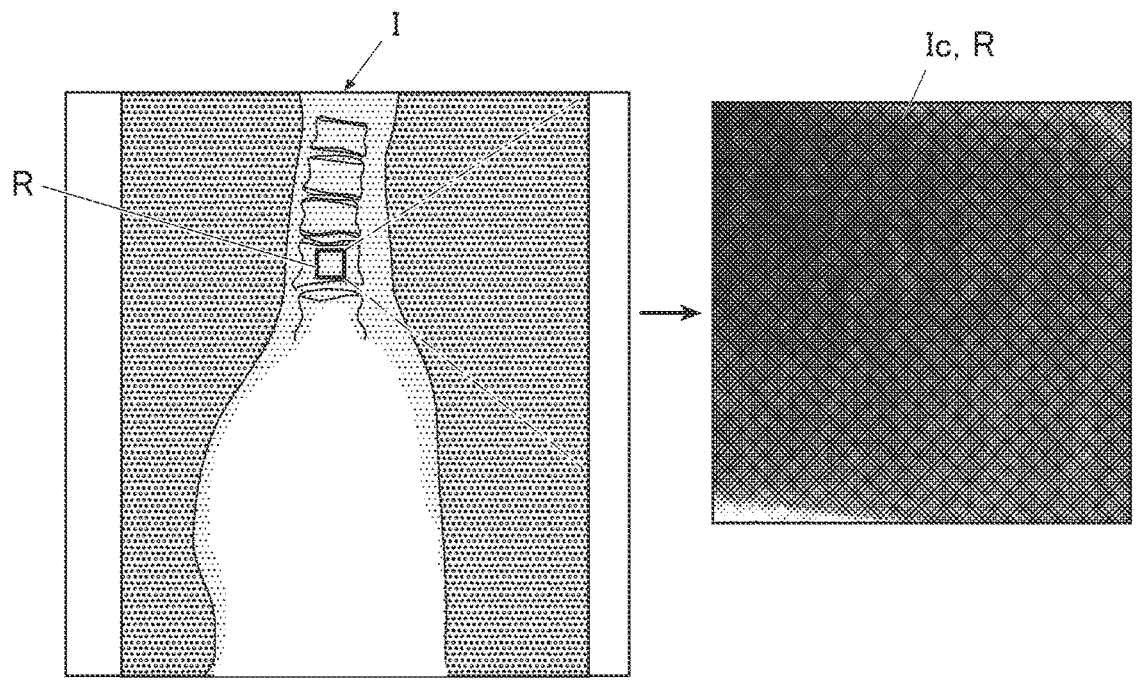
FIG. 5 is a diagram for describing a region-of-interest setting method of the index calculation process in FIG. 4.

The controller 31 is to set the region of interest R in the whole or a part of the radiograph I, and as shown on the left side in FIG. 5, the controller 31 desirably sets the region of interest R small enough such that a contrast is uniform for a structure (contour line, surface roughness, etc.) of a subject.

Furthermore, the controller 31 may automatically set the region of interest R on the basis of an image recognition result or radiographing order information that is set, or the region of interest R may be set (manually by a user) on the basis of an operation performed on the operation unit 35 by a user. If manual setting is allowed, a user may set a desired region as the region of interest R.

Furthermore, the controller 31 may cause the notifier 34 to notify of optimal radiographing conditions so that the exposure index of the region of interest R that is automatically set on the basis of the radiographing order information comes close to a target value.

Figure 7A:
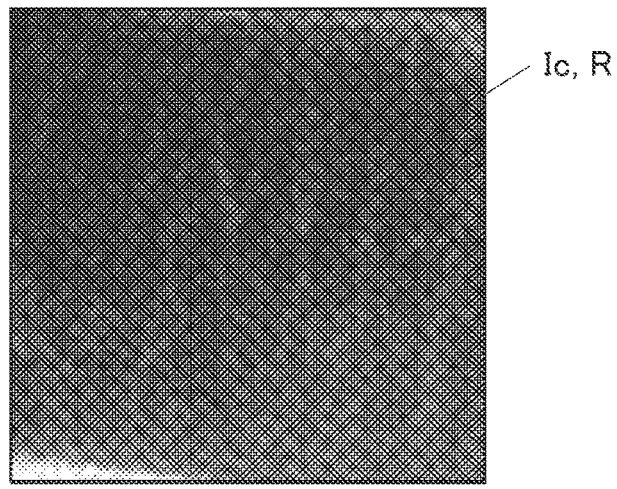
FIG. 7A is a cropped image that is created by the index calculation process in FIG. 4.

Moreover, as shown on the right side in FIG. 5 and FIG. 7A, for example, after setting the region of interest R, the controller 31 may cut out the region of interest R and treat it as a cropped image Ic different from the radiograph I.

Figure 6:
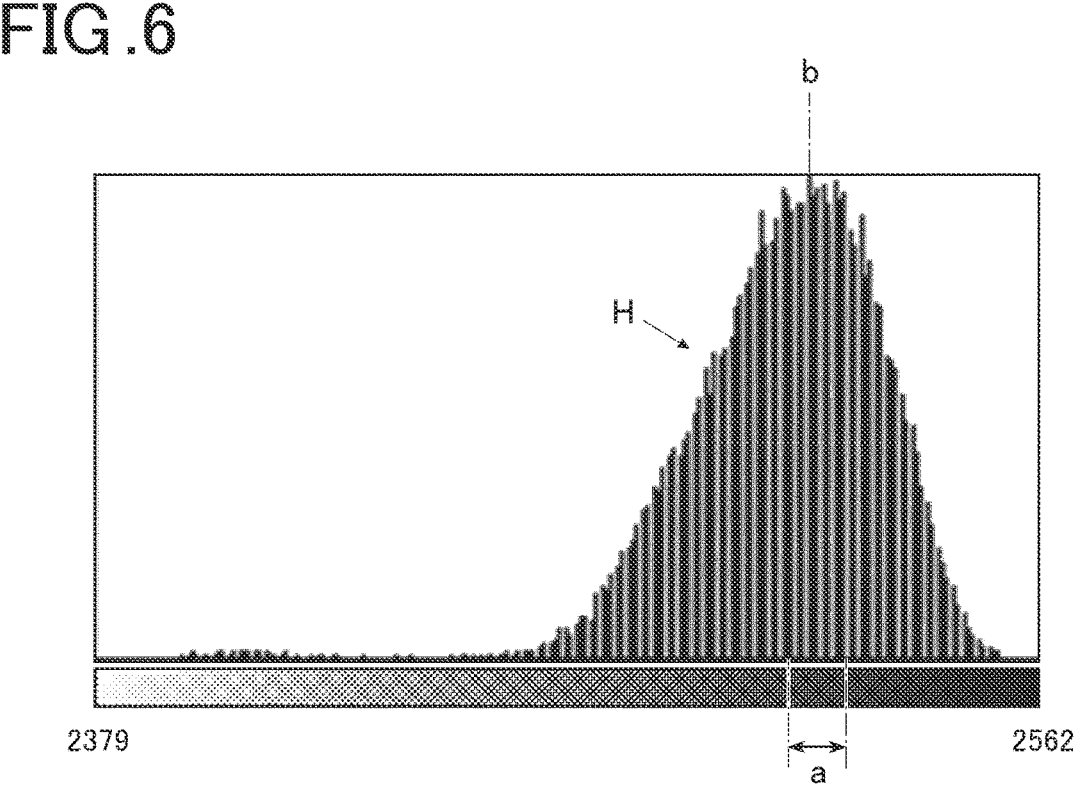
FIG. 6 is a density histogram of a region of interest that is created by the index calculation process in FIG. 4.

For example, as shown in FIGS. 4 and 6, after setting the region of interest R, the controller 31 creates a density histogram H of the region of interest R that is set (step S32).

As shown in FIG. 4 and FIGS. 7A to 7C, after creating the density histogram H, the controller 31 extracts a plurality of pixels with signal values within a specific range a from the created density histogram H (step S33).

For example, the controller 31 according to the present embodiment extracts all the pixels with a predetermined or user-specified representative signal value (such as a median value or an average value) or a signal value that takes a value close to the representative signal value (if the representative signal value is b, such a signal value is between 0.95b and 1.05b, for example).

As shown in FIG. 4, after extracting the pixels, the controller 31 creates an extracted image Ie using the plurality of extracted pixels (step S34).

Figure 7B:
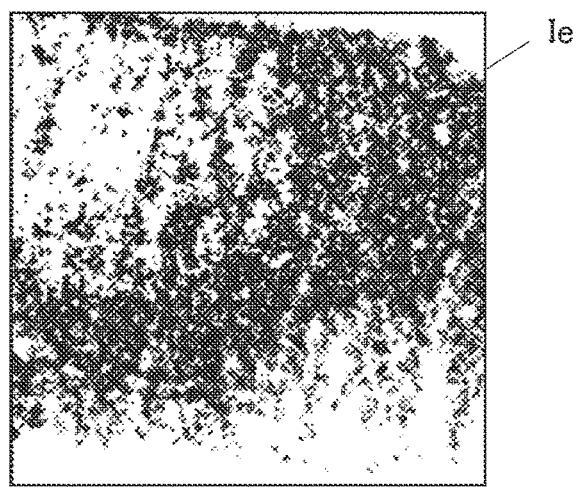
FIG. 7B is an extracted image that is created by the index calculation process in FIG. 4.

Specifically, for example, the controller 31 creates, as the extracted image Ie, an image as shown in FIG. 7B in which pixels are sparsely arranged, by arranging the extracted pixels at the same positions as before extraction.

As shown in FIG. 4, after creating the extracted image, the controller 31 creates a map image Im on the basis of the extracted image Ie (step S35).

Figure 7C:
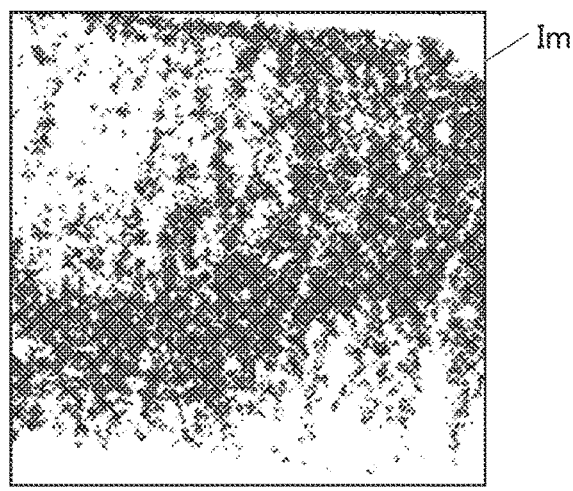
FIG. 7C is a map image that is created by the index calculation process in FIG. 4.

Specifically, the controller 31 creates, as the map image Im, an image as shown in FIG. 7C in which the signal values of pixels existing at positions corresponding to extracted pixels of the extracted image Ie are 1, and the signal values of pixels existing at other positions are 0.

As shown in FIG. 4, after creating the extracted image Ie, the controller 31 performs frequency analysis on the extracted image Ie on the basis of the created extracted image Ie (step S36).

Specifically, the controller 31 first performs calculation to obtain a normalized noise power spectrum (NNPS), for example.

Additionally, the controller 31 may alternatively obtain frequency characteristics other than the NNPS.

Furthermore, in addition to the frequency characteristics of the extracted image Ie, the controller 31 according to the present embodiment also calculates the frequency characteristics of the map image Im obtained from the extracted image Ie, in the same manner as for the extracted image Ie.

Figure 8:
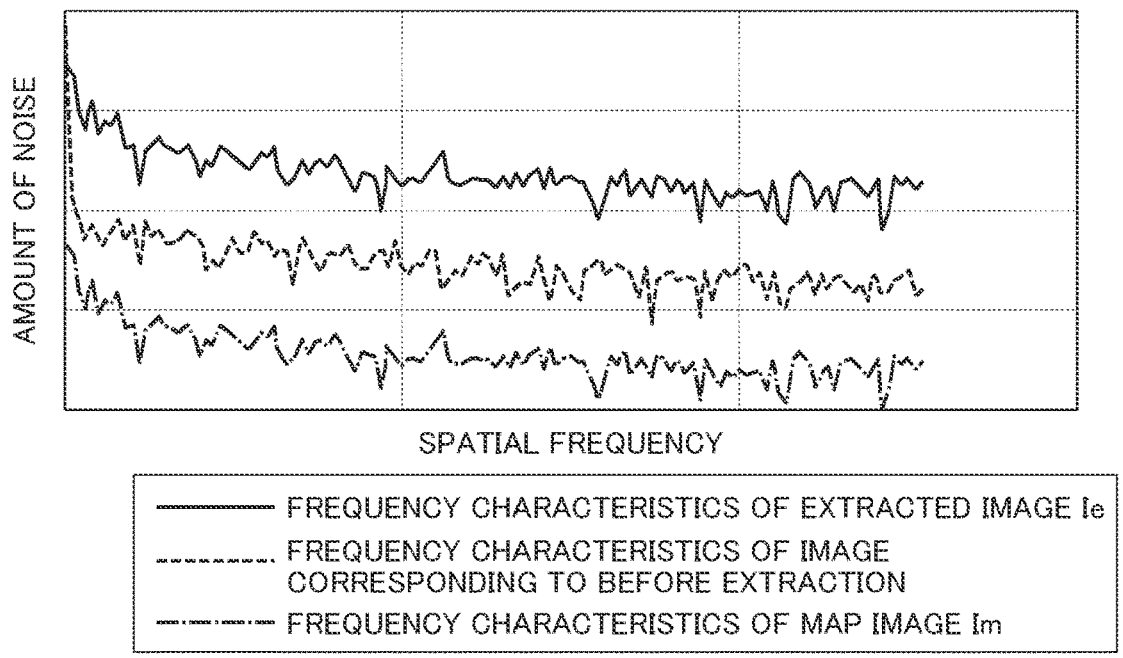
FIG. 8 is a graph showing frequency characteristics of various images shown in FIGS. 7A to 7C.

For example, the frequency characteristics of the extracted image Ie and the frequency characteristics of the map image Im may be expressed by a graph as shown in FIG. 8. Additionally, a horizontal axis of the graph is a spatial frequency (the further to the right, the higher the frequency), and a vertical axis is the amount of noise (the further to the top, the greater the noise).

Next, the controller 31 calculates the frequency characteristics of an image corresponding to before extraction, on the basis of the calculated frequency characteristics of the extracted image Ie and the calculated frequency characteristics of the map image Im.

Multiplication of the image corresponding to before extraction and the map image Im by each other in a spatial domain is equivalent to convolution of the map image Im with the image corresponding to before extraction in a frequency domain. On the basis of this fact, the controller 31 back-calculates the frequency characteristics of the image corresponding to before extraction by deconvoluting the frequency characteristics of the extracted image Ie using the frequency characteristics of the map image Im.

The "image corresponding to before extraction" obtained by such calculation is the image in which only the pixels with signal values within the specific range a are uniformly distributed.

Then, the controller 31 calculates the frequency characteristics of the S/N of the radiograph I as a frequency analysis result, by normalizing the frequency characteristics of the image corresponding to before extraction by the average value of the radiograph I.

Furthermore, the controller 31 may also calculate a variance of the image by integrating the frequency characteristics of the image corresponding to before extraction along the frequency axis.

As shown in FIG. 4, after performing frequency analysis on the extracted image Ie, the controller 31 calculates the exposure index on the basis of the frequency analysis result that is obtained (step S37).

The controller 31 according to the present embodiment calculates at least one of an integrated value or a slope value as the exposure index, for example.

The "integrated value" is obtained by integrating a function of the calculated frequency characteristics of the S/N of the radiograph I along the frequency axis.

The "slope value" is an absolute value of a slope of a graph when the calculated frequency characteristics of the S/N of the radiograph I are shown in a log-log graph.

Figure 9:
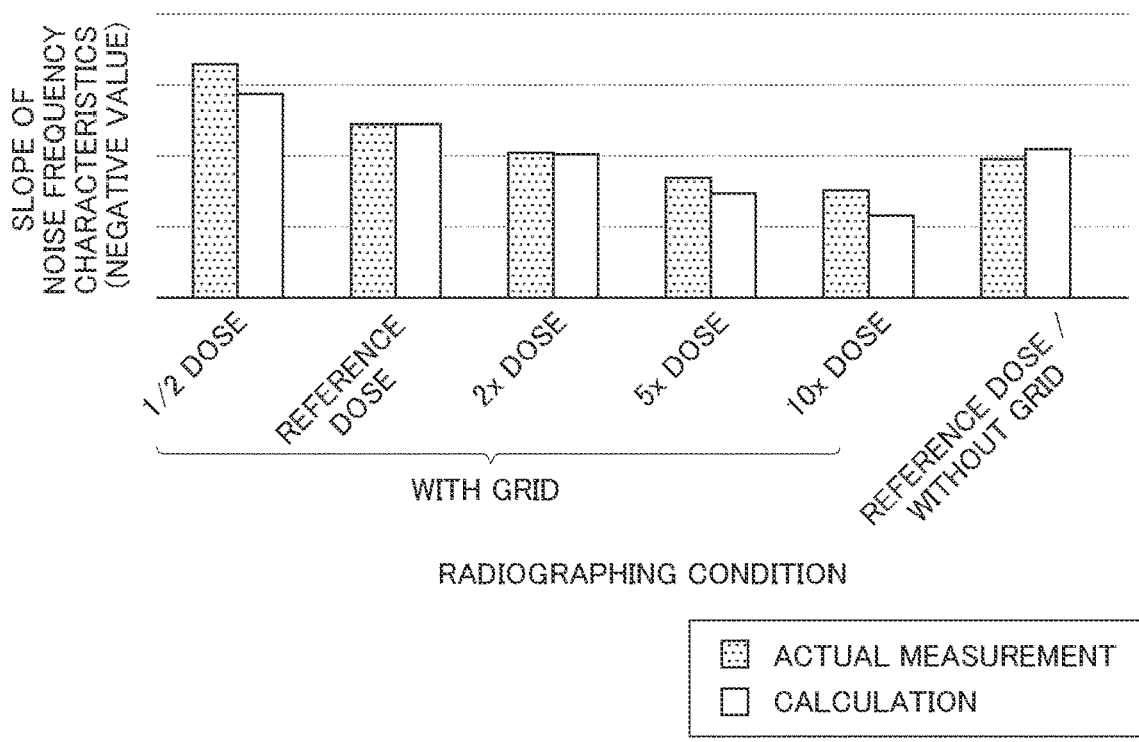
FIG. 9 is a graph showing examples of an exposure index that is calculated by the index calculation process in FIG. 4.

When the exposure index is calculated for each of a plurality of radiographs I captured while changing the radiographing conditions (presence/absence of a grid, the radiation dose), and the plurality of calculated exposure indices are shown as a graph, FIG. 9 is obtained, for example.

Additionally, a horizontal axis of the graph is the radiation dose and presence/absence of a grid, and a vertical axis is the slope value.

Furthermore, although a case of the slope value is shown in FIG. 9, exposure indices according to the radiographing conditions are also obtained with respect to the integrated value, in the same manner as for the slope value.

If the radiation dose is increased, radiation quantum noise that is affected by a modulation transfer function (MTF) of the radiation detector 2 becomes the dominant factor of image noise. Accordingly, the influence of the MTF of the radiation detector 2 tends to be increased (noise tends to be more blurred) and the exposure index (slope value) tends to be reduced as the radiation dose is increased.

Furthermore, the MTF of an image when there is scattered radiation is known to be MTF of the radiation detector×(1−scattered radiation content). That is, in a case where there is a great dose of scattered radiation (such as a case of a large physical frame or a case where there is no grid), frequency dependence of the MTF tends to be small, and the exposure index (slope value) tends to be great.

A change in the slope value caused by a change in the radiographing conditions becomes particularly noticeable at a high frequency of 1 cycles/mm or higher.

Additionally, "actual measurement" in the graph in FIG. 9 is the slope value of the frequency characteristics of noise at 1 cycles/mm or higher that is actually calculated using the calculation method described above, and "calculation" is a theoretical value of the slope value that is calculated on the basis of a theoretical value of properties of the radiation detector 2, an actually measured value of the scattered radiation content, and an image average value of the region of interest R (corresponding to an image that is obtained by uniform emission of radiation).

As shown in FIG. 9, an increase/decrease in the calculated value and an increase/decrease in the actually measured value when the radiographing conditions are changed show a similar tendency, and thus, the exposure index according to the present embodiment can be said to well grasp the actual phenomenon.

Additionally, the controller 31 may grasp the frequency characteristics of the noise of the radiation detector 2 in advance for each reaching dose, and may convert the calculated exposure index into the scattered radiation content or the S/N.

Furthermore, instead of converting the exposure index into the S/N, the controller 31 may convert the exposure index into at least one image quality index between the square of (S/N) and the NNPS.

Furthermore, the controller 31 may acquire the contrast of a structure in the radiograph I, and may convert the calculated exposure index into a contrast transfer function (CTF) on the basis of the contrast.

Furthermore, in step S36 described above, the controller 31 may extract a plurality of pixels with signal values within a second specific range different from the specific range a, create a second extracted image using the plurality of extracted pixels, perform frequency analysis on each of the extracted image Ie and the second extracted image that are created, and calculate, in step S37, the exposure index on the basis of each frequency analysis result that is obtained.

This enables an error in the frequency analysis caused by a structure remaining in the region of interest R to be reduced, and a more accurate exposure index may be calculated.

As shown in FIG. 4, after calculating the exposure index, the controller 31 according to the present embodiment calculates a deviation index indicating a degree of deviation of the exposure index from the target value of the exposure index, on the basis of the calculated exposure index and the target value of the exposure index (step S38).

For example, the deviation index may be calculated by the same method as that of calculation of a conventional deviation index (DI). Specifically, the controller 31 according to the present embodiment performs calculation by substituting the calculated exposure index and the set target value in the following Expression (1).

$$\text{Deviation index} = 10 \text{ Log } 10(\text{exposure index/target value of exposure index}) \quad (1)$$

In the case where the radiograph I is a still image, the controller 31 performs the process in step S3 for each radiograph I, and in the case where the radiograph I is a moving image, the controller 31 performs the process in step S3 for all the frame images forming the moving image or for some of the plurality of frame images.

Additionally, in the process in step S3 described above, the controller 31 may also calculate the second exposure index (the conventionally used EI) that is related to the dose reaching the radiation detector, on the basis of the acquired image data.

In this case, the controller 31 may calculate the deviation index (the conventionally used DI) of the second exposure index with respect to the target value of the second exposure index, on the basis of the second exposure index and the target value of the second exposure index(the conventionally used EIT).

Furthermore, in the case of calculating the second exposure index or the deviation index thereof in the process in step S3 described above, the deviation index of the exposure index and the deviation index of the second exposure index may be compared with each other.

Furthermore, the processes from steps S34 to S36 may be omitted by storing properties of the radiation detector 2, or more specifically, the frequency characteristics of noise in an image for each signal value and the scattered radiation content, in the memory 33, and by the controller 31 using the frequency characteristics of noise stored in the memory 33 in the process in step S3 described above. This allows the exposure index to be easily calculated.

As shown in FIG. 3, after calculating the exposure index, the controller 31 according to the present embodiment determines whether the calculated exposure index is within a target range based on the target value of the exposure index (step S4).

Specifically, the controller 31 determines whether the numerical value of the deviation index is equal to or smaller than a predetermined value, whether a difference between the value of the exposure index and the target value is equal to or smaller than a predetermined value, or the like.

Additionally, in the case where the controller 31 is to calculate the second exposure index in the process in step S3 described above, the controller 31 may determine, in step S4, whether the calculated second exposure index is within a second target range based on the target value of the second exposure index.

After calculating the exposure index, the controller 31 according to the present embodiment causes the value of at least one of the radiographing conditions at the time of capturing of the radiograph, the calculated exposure index, the second exposure index, or the scattered radiation content calculated on the basis of the radiograph to be accumulated in the database 41 for each radiation part, each physical frame of a subject, each user or each modality (step S5).

By looking and comparing various indices accumulated in the database 41, a user may grasp the cause of variance in the second exposure index at a part with a great amount of scattered radiation (such as a trunk portion of a body), or an optimal value of an optimal exposure index (new) for the image quality.

Additionally, the process in step S5 may alternatively be performed after the process in step S6 described later.

After accumulating values in the database 41, the controller 31 causes the notifier 34 to notify of a matter based on the calculated exposure index (step S6).

Specifically, the controller 31 causes the notifier 34 to notify of at least one value among the calculated exposure index, the target value of the exposure index, and the calculated deviation index.

The notifier 34 according to the present embodiment is to perform notification using one of screen display, light emission, audio, or vibration.

Figure 10:
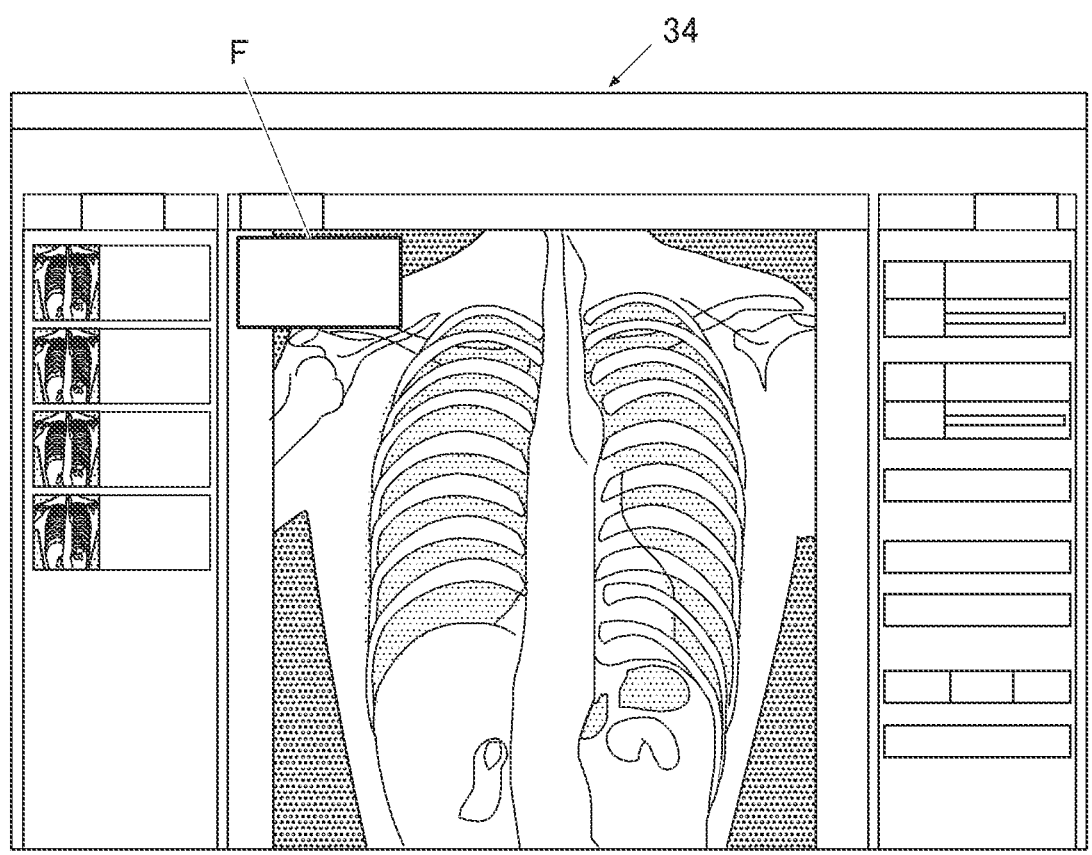
FIG. 10 is a diagram showing an example of an exposure index notification method.

In the case of performing notification by screen display (in the case where the notifier 34 is a display apparatus), the controller 31 causes the notifier 34 to perform display in a region in the radiograph where the subject is not shown (such as a region indicated by a frame F in FIG. 10), in the same manner as for an index such as the conventionally used second exposure index or the like (EI, EIT, DI). This allows a user to manage the dose while taking the noise into account, by the same operation method as for the conventional second exposure index or the like.

Furthermore, in the case where the matter to be notified is the deviation index, the user is enabled to grasp immediately after radiographing, by the size of the deviation index, whether the image quality (S/N) of the radiograph is sufficient.

Moreover, in the case where the matter to be notified is the target value of the exposure index, the user is enabled to set an appropriate target value that takes into account a change in the signal value or the scattered radiation content due to the physical frame, or a change in the signal value or the scattered radiation content due to presence/absence of a grid or performance/non-performance of the scattered radiation correction process.

Furthermore, in the case where the controller 31 is to calculate the second exposure index in the process in step S3 described above (index calculation process), the controller 31 may notify of the calculated second exposure index together with the calculated exposure index. This enables correspondence relationships between the exposure index, the target value of the exposure index and the deviation index according to the present embodiment, and the second exposure index (EI), the target value (EIT) of the second exposure index and the deviation index (DI) to be easily grasped.

Furthermore, in the case where the controller 31 is to determine whether the exposure index (the second exposure index) is within the target range (the second target range) in the process in step S3 described above, if the second exposure index is determined to be within the second target range, and the exposure index is determined to be not within the target range, the controller 31 may issue a notification to the effect. This enables a radiograph with insufficient image quality which is not found just by checking the conventional exposure index to be found, and the user may be urged to perform radiographing again.

Furthermore, in the case where the controller 31 is to compare the deviation index of the exposure index and the deviation index of the second exposure index against each other in the process in step S3 described above, if the degree of deviation between the deviation index of the exposure index and the deviation index of the second exposure index is at or greater than a predetermined degree, the controller 31 may, in step S6, cause the notifier 34 to issue a notification to urge revision of the target value of the second exposure index.

Moreover, the controller 31 may issue a feedback to cause the user to revise the target value of the second exposure index, by using the information accumulated in the database 41, such as by notifying of a target dose of the second exposure index for each physical frame, for example.

Moreover, the controller 31 may aggregate the exposure indices accumulated in the database 41 every predetermined period of time (such as one month), and if the number of times when the exposure index is deviated from the target value by a predetermined degree or more is determined to be a predetermined number of times or more (frequently deviated) or the deviation from the target value of the exposure index is determined to be at or greater than a predetermined value (greatly deviated), the controller 31 may cause the notifier 34 to issue a notification to the effect or to notify of an appropriate target value.

As described above, with the console 3 (image processing apparatus) according to the present embodiment, a notification is issued on the basis of the exposure index that is related to noise and that is different from the conventional second exposure index that does not take noise into account, or in other words, a numerical value that is changed not only by the dose reaching the radiation detector 2, but also by the scattered radiation content or the S/N that affects the image quality, and thus, when a radiograph is captured, a user may accurately determine not only whether radiation of an intended dose reached the radiation detector, but also whether the obtained radiograph achieves an intended image quality.

Furthermore, in the case where a notification based on the exposure index indicates that the reaching dose is not as intended, or that the image quality of the radiograph is not optimal, the user changes, in the subsequent radiographing, the dose of radiation to be emitted such that an optimal image quality (S/N) is achieved, on the basis of the exposure index that is notified. Accordingly, in the subsequent radiographing, diagnosis may be prevented from becoming valueless due to a radiograph being unclear because of insufficient dose, or a subject may be prevented from being exposed to a needlessly high dose of radiation because of an excessive dose.

Second Embodiment

Next, a second embodiment of the present invention will be described. Additionally, structures the same as those of the first embodiment described above will be denoted by the same reference signs, and a description thereof will be omitted.

A console 3A (see FIG. 1) provided in a radiographic imaging system 100A according to the present embodiment is different from the console 3 of the first embodiment with respect to storage contents stored in a memory 33A (see FIG. 2).

Specifically, contents of an index calculation process (step S3A; see FIG. 3) that is performed by the console 3A is different from the index calculation process (step S3) according to the first embodiment.

In the index calculation process according to the present embodiment, the controller 31 first creates a density histogram for the entire radiograph (step S31A).

After creating the density histogram, the controller 31 calculates a body thickness of the subject on the basis of the created density histogram (step S32A).

After calculating the body thickness, the controller 31 calculates the scattered radiation content on the basis of the calculated body thickness of the subject (step S33A).

After calculating the scattered radiation content, the controller 31 calculates the S/N of the radiograph on the basis of signal values of the radiograph and the calculated scattered radiation content (step S34A).

After calculating the S/N, the controller 31 calculates the exposure index on the basis of the calculated S/N (step S35A).

As described above, with the console 3A (image processing apparatus) according to the present embodiment, as with the console 3 according to the first embodiment described above, when a radiograph is captured, a user may accurately determine not only whether radiation of an intended dose reached the radiation detector, but also whether the obtained radiograph achieves an intended image quality.

Furthermore, because the body thickness of a subject is obtained every time radiographing is performed, the value of at least one of the radiographing conditions, the exposure index, the second exposure index, or the scattered radiation content may be accumulated in the database 41 for each physical frame.

Third Embodiment

Next, a third embodiment of the present invention will be described. Additionally, structures the same as those of the first embodiment described above will be denoted by the same reference signs, and a description thereof will be omitted.

A console 3B (see FIG. 1) provided in a radiographic imaging system 100B according to the present embodiment is different from the console 3 of the first embodiment described above with respect to programs stored in a memory 33B (see FIG. 2).

Specifically, contents of an index calculation process (step S3B; see FIG. 3) that is performed by the console 3B is different from the index calculation process (step S3) according to the first embodiment described above.

In the index calculation process according to the present embodiment, the controller 31 first calculates a remaining rate of a structure of a subject in a radiograph, on the basis of a ratio between the frequency characteristics of the radiograph and the frequency characteristics as a reference obtained from a radiograph captured in a state where a subject is absent, or an in-plane distribution of S/N of the radiograph (step S31B).

After calculating the remaining rate of a structure, the controller 31 calculates the exposure index on the basis of the calculated remaining rate (step S32B).

As described above, with the console 3B (image processing apparatus) according to the present embodiment, as with the console 3 according to the first embodiment, when a radiograph is captured, a user may accurately determine not only whether radiation of an intended dose reached the radiation detector, but also whether the obtained radiograph achieves an intended image quality.

(Supplementary Technology)

Conventionally, manufacturers that developed radiographic imaging systems before the second exposure index (EI) came to be used performed management of the radiation dose using an individual quality (for example, 80 kV quality) as a reference, by conventional appliances that managed the radiation dose by an index (such as an S value) different from the second exposure index (EI). For its part, the second exposure index is calculated using RQAS quality, which is an IEC standard, as a reference.

Accordingly, to calculate the EI using a conventional apparatus, a different index has to be converted into the EI using a predetermined conversion factor.

However, an EI calculated in such a manner is sometimes deviated from the theoretical value of the EI calculated on the basis of the radiation dose measured by a dosimeter.

In view of such circumstances, the image processing apparatus 3 may be provided with a function of correcting the conversion factor in a case where the degree of deviation of the calculated EI from the theoretical value of the EI is at or greater than a predetermined degree (such as +20% or more or −20% or less of the theoretical value).

Furthermore, in such a case, the image processing apparatus 3 may be further provided with a function of notifying of a corrected value of the EI calculated using the conversion factor after correction, together with the EI calculated using the conversion factor before correction.

Furthermore, in the case where the function of correcting the conversion factor is provided in the image processing apparatus 3, the image processing apparatus 3 may be further provided with a function of automatically correcting the EIT determined by the conversion factor before correction to the EIT according to the conversion factor after correction.

Heretofore, the present invention has been specifically described using the embodiments, but the present invention is not limited to the embodiments described above, and changes can be made within the scope of the present invention.

For example, in the embodiment described above, the console 3 includes the function of performing the radiographing process, but the function of performing the radiographing process or the function of performing the index calculation process that is a part of the radiographing process may be provided in another apparatus provided in the radiographic imaging system 100 or another system that is connected to the radiographic imaging system 100.

Furthermore, the exposure index calculation technique described above may be applied not only to two-dimensional images, but also to three-dimensional images.

Furthermore, in the embodiments described above, the exposure index of a radiograph (medical image) is calculated, but the exposure (image quality) index calculation technique described above may be applied to images other than radiographs, such as images captured by an optical camera.

Moreover, in the description given above, an example is disclosed where a semiconductor memory or a hard disk is used as a computer-readable medium for programs according to the present invention, but such an example is not restrictive.

A non-volatile memory such as a flash memory or a portable recording medium such as a CD-ROM may also be used as the computer-readable medium.

Furthermore, a carrier wave (a carrier) may also be used by the present invention as a medium for providing data of programs according to the present invention through a communication line.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising a hardware processor that:

acquires image data of a radiograph including a plurality of frame images, and calculates an exposure index based on the acquired image data, wherein the hardware processor calculates the exposure index for at least two frame images among the plurality of frame images, wherein the hardware processor calculates a deviation index indicating a degree of deviation of the exposure index from a target value of the exposure index based on the exposure index and the target value of the exposure index.

2. The image processing apparatus according to claim 1, wherein the hardware processor causes a notifier to perform notification of at least one of the exposure index, the target value of the exposure index, and the deviation index.

3. The image processing apparatus according to claim 1, wherein the hardware processor sets a region of interest limited to a size whereby a contrast is uniform for a structure of a subject, the region of interest being set in at least a part of the radiograph.

4. The image processing apparatus according to claim 1, wherein the hardware processor causes a notifier to perform notification of the exposure index.

5. The image processing apparatus according to claim 4, wherein the notifier performs the notification using one of screen display, audio and vibration.

6. The image processing apparatus according to claim 1, wherein the exposure index is a first exposure index related to noise in the radiograph.

7. The image processing apparatus according to claim 6, wherein the first exposure index is related to a scattered radiation content.

8. The image processing apparatus according to claim 6, wherein the hardware processor:
- calculates a scattered radiation content based on a body thickness of a subject,
- calculates a signal-to-noise ratio (S/N) of the radiograph based on a signal value of the radiograph and the calculated scattered radiation content, and
- calculates the first exposure index based on the calculated S/N.

9. The image processing apparatus according to claim 1, wherein the exposure index is a second exposure index related to a dose reaching a radiation detector.

10. The image processing apparatus according to claim 1, wherein the exposure index includes a first exposure index related to noise in the radiograph and a second exposure index related to a dose reaching a radiation detector.

11. The image processing apparatus according to claim 10, wherein the hardware processor causes a notifier to perform notification of the second exposure index, together with the first exposure index.

12. The image processing apparatus according to claim 11, wherein the hardware processor:
- determines whether the first exposure index is within a first target range based on a target value of the first exposure index,
- determines whether the second exposure index is within a second target range based on a target value of the second exposure index, and
- causes the notifier, in a case in which the second exposure index is determined to be within the second target range and the first exposure index is determined to be not within the first target range, to perform notification of such determination.

13. The image processing apparatus according to claim 11,
wherein the deviation index includes a deviation index of the first exposure index and a deviation index of the second exposure index, and
wherein the hardware processor causes the notifier, in a case in which a degree of deviation between the deviation index of the first exposure index and the deviation index of the second exposure index is equal to or greater than a predetermined degree, to notify that the degree of deviation between the deviation index of the first exposure index and the deviation index of the second exposure index is equal to or greater than the predetermined degree.

14. The image processing apparatus according to claim 11, wherein the notifier performs the notification using one of screen display, audio and vibration.

15. A radiation determination method comprising:
- acquiring image data of a radiograph including a plurality of frame images;
- calculating an exposure index based on the acquired image data, for at least two frame images among the plurality of frame images; and
- calculating a deviation index indicating a degree of deviation of the exposure index from a target value of the exposure index based on the exposure index and the target value of the exposure index.

16. A non-transitory, computer-readable recording medium having stored thereon a program which, when executed by a computer, causes the computer to perform operations comprising:
- acquiring image data of a radiograph including a plurality of frame images;
- calculating an exposure index based on the acquired image data, for at least two frame images among the plurality of frame images; and
- calculating a deviation index indicating a degree of deviation of the exposure index from a target value of the exposure index based on the exposure index and the target value of the exposure index.

* * * * *